United States Patent [19]

Davis et al.

[11] B 4,001,360

[45] Jan. 4, 1977

[54] METHOD FOR PREPARING PULVERULENT POLYMERS EXHIBITING AN APPARENT INCREASE IN GLASS TRANSITION TEMPERATURE AND SHAPING THE RESULTANT POLYMER MATERIALS

[76] Inventors: William J. Davis, 1700 Reading Blvd., Wyomissing, Pa. 19610; Anthony J. Izbicki, 1704 Westwood Drive, Reading, Pa. 19610

[22] Filed: Nov. 19, 1973

[21] Appl. No.: 417,164

[44] Published under the second Trial Voluntary Protest Program on March 2, 1976 as document No. B 417,164.

Related U.S. Application Data

[63] Continuation of Ser. No. 215,565, Jan. 5, 1972, abandoned.

[52] U.S. Cl. .............................. 264/49; 260/2.5 B; 260/17.4 SG; 264/115; 264/126; 264/140; 264/DIG. 13; 427/195; 428/304; 428/327; 428/402
[51] Int. Cl.² ................... B29D 27/00; B29D 27/08
[58] Field of Search ............. 264/50, 49, 126, 115, 264/140, DIG. 13; 260/17.4 SG, 2.5 B; 428/304, 327, 402; 427/195

[56] References Cited

UNITED STATES PATENTS

| | | | |
|---|---|---|---|
| 2,858,282 | 10/1958 | Fairclough | 264/50 X |
| 2,875,047 | 2/1959 | Oster | 260/17.4 SG |
| 3,179,607 | 4/1965 | Suda et al. | 260/17.4 SG |
| 3,215,647 | 11/1965 | Dunn | 264/50 UX |
| 3,650,995 | 3/1972 | Erickson | 264/50 X |

OTHER PUBLICATIONS

The Condensed Chemical Dictionary, Seventh Edition, Completely Revised and Enlarged by Arthur and Elizabeth Rose, New York, Reinhold, c 1966, p. 544.

*Primary Examiner*—Philip Anderson
*Attorney, Agent, or Firm*—Synnestvedt & Lechner

[57] ABSTRACT

Polymeric bodies having selected morphological properties are prepared by effecting an apparent increase in the glass transition temperature of the polymer to cause it to become glassy and manipulating the polymer while it is in the glassy state. In the preferred practice of the invention, the apparent increase in the glass transition temperature is a reversible function so that after the morphological properties of the polymer have been developed, the normal glass transition temperature of the polymer may be restored.

The process of this invention finds utility in the preparation and formulation of polymers in powdered form; it provides a practical method for the formation of powders in unusual size ranges, which, in turn, makes possible the formation of shaped articles by novel processes; and it provides a simple method for making products, such as open-cell foams and surfaces in relief, that have unique physical characteristics.

13 Claims, 1 Drawing Figure

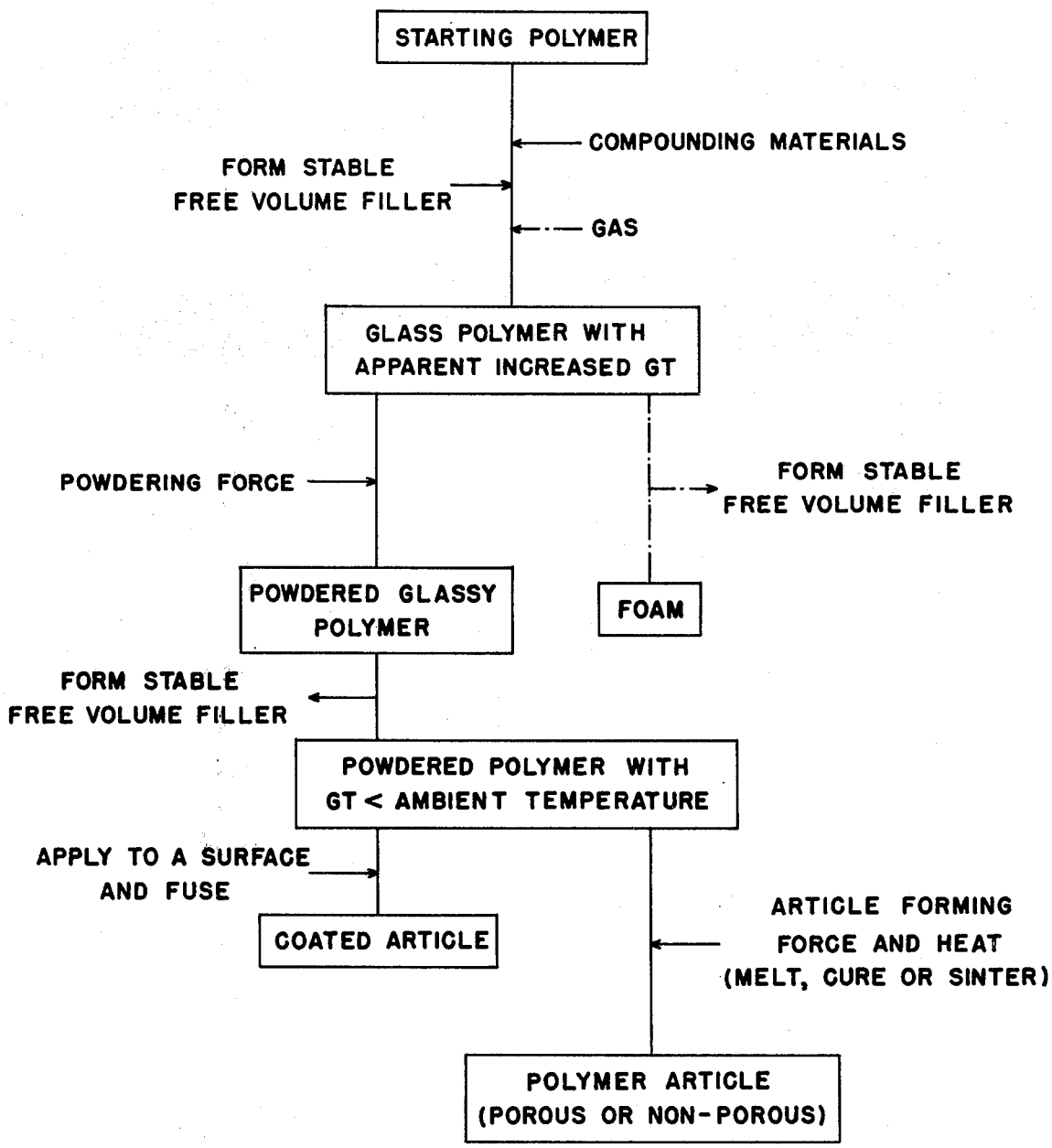

METHOD FOR PREPARING PULVERULENT POLYMERS EXHIBITING AN APPARENT INCREASE IN GLASS TRANSITION TEMPERATURE AND SHAPING THE RESULTANT POLYMER MATERIALS

This is a continuation of application Ser. No. 215,565, filed Jan. 5, 1972 and now abandoned.

BACKGROUND OF THE INVENTION

1. Field of the Invention

This invention relates to novel methods and means for obtaining polymeric bodies having selected morphological properties and the polymeric bodies so produced. More particularly, this invention relates to a process in which a glassy state is induced in a polymer that normally displays properties of plastic flow, without fundamental dependence on the temperature of the polymer. This permits working the polymer while it is in a glassy state to facilitate obtaining polymeric bodies having the desired morphological properties, and then, if desired, restoring the polymer to its normal state of plastic flow.

2. Description of the Prior Art

The present invention is primarily based on the discovery that certain morphological properties can be developed in polymeric materials if the polymeric materials are formed or otherwise manipulated while they are in a glassy state. (As used herein, the terms "polymers" and "polymeric materials" refer to polymers that are derived from either natural or synthetic materials.) In order to induce a glassy state, it is necessary to alter the rheological properties of the polymer, such as elastic deformation and flow.

Without resorting to a chemical modification of a polymeric chain, there are basically several methods available that may be used to alter the rheological properties of a polymer. These methods may make use of the inclusion of solid filler materials, plasticizers and antiplasticizers, or may be dependent upon adjusting the temperature of the polymer.

By way of example, it is generally believed that when finely divided fillers are dispersed amongst the molecular groups of a polymer, the fillers impede the organization of the molecular groups into what would otherwise be their natural configuration. Depending upon the characteristics and the amount of the filler material used, numerous changes in the rheological properties of the polymer can be made by this physical interposition of the fillers.

Plasticizers, on the other hand, may be viewed as internal lubricants that provide the molecular configuration with a greater freedom of movement. Plasticizers generally will have the effect of softening the polymer, improving crystallization resistance, increasing low temperature flex, and reducing the brittle temperature. Antiplasticizers increase tensile modulus and tensile strength with an attendant reduction in ultimate elongation and impact strength.

The effect of temperature upon the polymer, unlike the addition of the foregoing, is a reversible function and may cause variations of the properties of the polymer in either direction. Quite generally, as the temperature of a polymer is reduced, it stiffens, progressively moves to a glassy state and becomes more friable. When the temperature of most polymers is increased, they soften and, if thermoplastic, will approach or enter a state of viscous flow. Thus, for example, by making use of this phenomenon at its two extremes, cryogenic temperatures can be utilized to grind otherwise intractable polymers and temperatures above the melting point can be utilized to shape articles such as by extrusion or molding.

It has now been found that a glassy state can be induced in polymers that normally exist in the plastic state without reliance upon reducing the temperature of the polymer to its glass transition temperature and without permanently altering the properties of plastic deformation and flow. Thus, in essence, the present invention proposes a novel reversible process for altering the apparent glass transition temperature of a polymer, which, in turn, makes it possible to obtain polymers having certain desired morphological properties that either are not known to the prior art or which cannot conveniently be obtained by prior art processes.

SUMMARY OF THE INVENTION

Accordingly, it is an object of this invention to provide a method that facilitates the production of polymeric bodies having selected morphological properties.

Another object of this invention is to provide a method that makes it possible to produce polymeric bodies having novel morphological properties.

Another object of this invention is to provide a method for producing and compounding polymeric bodies in comminuted form.

Another object of this invention is to provide a method for producing comminuted polymers of unusual sizes.

Another object of this invention is to provide a method for the manufacture of articles from polymeric powders produced by this invention which reduces the need for high temperatures, high compaction pressures and costly molds.

Another object of this invention is to provide an improved method for compounding, molding and curing elastomeric materials such as natural and synthetic rubbers.

Another object of this invention is to provide improved methods and means for manufacturing porous articles from polymeric materials.

Another object of this invention is to provide porous articles manufactured from polymeric materials that have selectively controlled capillarity, cellular configuration and surface characteristics.

Another object of this invention is to provide porous materials and methods for their manufacture which are especially suited for use in storing fluids and controllably releasing and distributing the fluids upon demand.

Another object of this invention is to provide a novel method for producing contoured articles and relief surfaces.

These and other objects of this invention are achieved by effecting an apparent increase in the glass transition temperature of a polymer to cause it to become glassy and manipulating the polymer while it is in the glassy state. The glassy state is induced by filling the free volume of the polymer with a form-stable material without causing a material dislocation of the normal configuration of the molecules. To accomplish this, the form-stable materials must be compatible with the geometry of the molecular voids, and, as form-stable materials of this size and shape are, from a practical standpoint, virtually nonexistent, special techniques are utilized to obtain them and to distribute them throughout the molecular voids. In a preferred method of this invention, the form-stable material is dissolved in a suspension of a polymer, such as a latex, and is precipitated simultaneously with the coagulation of the polymer, at essentially a molecular level, by removing liquid from the solution/suspension. The process can be reversed by leaching the form-stable material from the polymer to restore a state of plastic flow.

DEFINITIONS

In order adequately to describe the instant invention, it is necessary to establish a frame of reference for defining certain terms which otherwise could be misunderstood, even by those skilled in the art. Particularly this is true with regard to those aspects of this invention that deal with the elastic deformation and/or flow properties of various materials. The below definitions, while in some instances rather arbitrary, are largely based upon definitions promulgated by the British Society of Rheology which have been reproduced in outline form in such standard texts as, for example, the Encyclopedic Dictionary of Physics, Volume 6, page 539 et seq. (1962), published by MacMillan Publishing Company, New York, New York. In accordance with the nomenclature setforth therein, the progression from Euclidean solids to Newtonian fluids can be organized somewhat as follows.

Disregarding nondeformable Euclidean solids, the first major rheological category is comprised of materials that are subject to elastic deformation. By this is meant that when a material is strained in shear by a given stress, the material will display elastic properties and tend to return to its original shape when the stress is relieved.

Those materials that display properties of elastic deformation are arbitrarily termed either "ideal" or "nonideal" materials. Of the ideal materials, there are those in which the stress in directly proportional to strain, the recovery upon removal of the stress is immediate, and the recovery is complete. These are termed "Hookean solids." The other category of ideal solids is the "non-Hookean solids" which are similar in all respects to Hookean solids except that stress is not directly proportional to strain.

The nonideal elastic materials may be characterized in that when a stress is applied, the strain will increase with time and, when the stress is removed, the recovery is not immediate and may not be complete. These nonideal elastic materials are further categorized as those that are completely recoverable and those that are incompletely recoverable. Those that are incompletely recoverable are subdivided into plastoelastic materials and viscoelastic materials. Both of these incompletely recoverable materials display properties of viscous liquids in that they will flow under stress and in that the rate of flow is proportional to the applied stress. They are distinguishable from each other in that plastoelastic materials require a certain minimum stress to be applied prior to the time that any appreciable flow is noted, whereas viscoelastic materials will begin to flow under the influence of any nominal stress. For this reason, plastoelastic materials are similar to solids in the sense that they are form-stable and not subject to deformation at low stresses, such as ordinarily would be imposed by their own weight. Viscoelastic materials, on the other hand, may be considered liquids since they are not form-stable and will flow under very low stresses such as may be imposed by their own weight.

The second broad rheological category for materials is defined by their properties of flow under stress rather than by their properties of elastic recovery. Note that there is an overlap between the first and second categories which makes necessary certain double inclusions. The materials that flow may be broadly divided into two groups: those that display plastic flow and those that display viscous flow.

Those materials that display plastic flow are termed plastoelastic, plastoinelastic, and Bingham solids, and those that display viscous flow are termed liquids.

As previously noted, plastoelastic materials have some elastic recovery and require that a certain minimum stress be imposed before any flow is occasioned. The plastoinelastic solids and the Bingham solids both require a minimum stress to cause flow, but differ from the plastoelastic solids in that both the plastoinelastic and Bingham solids do not recover when a stress is relieved. The Bingham solids differ from the plastoinelastic solids only in that they represent a special case in which the curves representing strain under a given stress vs. time, and rate of deformation vs. stress, are essentially straight lines. Thus, both the plastoinelastic materials and the Bingham materials may be defined as materials that are form-stable below a critical stress, but will flow at a rate proportional to the excess of the stress over a certain yield value.

The second category of materials that flow under an applied stress are the viscous materials which, in turn, are subdivided into non-Newtonian and Newtonian liquids.

The non-Newtonian materials are, in turn, categorized as viscoelastic and viscoinelastic. These materials display similar properties to those of the plastoelastic and plastoinelastic materials respectively with reference to their characteristic curves in which strain under a given stress is plotted against time and with reference to their recovery or nonrecovery after the stress is relieved. They differ from the plastic materials, however, in that they are deformed under any minimum stress and thus have substantially a zero yield value.

The Newtonian liquids are merely a special case of viscoinelastic materials in which curves showing strain under a given stress vs. time, and rate of deformation vs. stress, are essentially straight lines. Thus, as mentioned above, materials that display viscous flow can be defined as liquids herein since they are not form-stable and may be deformed under the stress of their own weight.

Summarizing the above, the term "form-stable materials" is defined for the herein purposes as materials that are sufficiently rigid so that, when unconfined, they will maintain their shape, at least, under low to moderate stresses such as may be imposed by their own weight, if they are of reasonable size or shape.

Solids are defined, for the herein purposes, in the Hookean sense that they are form-stable, they may be deformed under stress, and that upon removal of the stress, their recovery will be substantially complete. Generally, these include Hookean and non-Hookean solids as well as completely recoverable nonideal solids.

Liquids are defined, for the herein purposes, as those materials that are deformable under stress, that may not recover or only recover in part when a stress is relieved, and that are not form-stable. Generally, these include viscoelastic materials, viscoinelastic materials, and Newtonian fluids.

THEORETICAL BASIS FOR THE INVENTION

The theoretical basis for this invention is not understood with certainty, but the following mechanism is advanced since it is rational and consistent both with current scientific thought and observed data.

It is known that the molecules of a solid material, while in close proximity to each other, align themselves in such a manner that there are spaces left between adjacent molecules. Collectively, these spaces are considered on an intermolecular level and are referred to as the "free volume." The "occupied volume" is considered to be the volume of the molecules at static conditions — that is, without giving consideration to the volume filled during the movement of the molecules. The "free volume ratio" is, in turn, defined as the ratio of free volume to total volume.

According to accepted qualitative and quantitative investigations of the glassy state, a glassy state can be induced thermally by reduction of the thermally available degrees of volumetric freedom to a point where long-range cooperation between segments of a polymer molecule cannot occur. This result can be thermally effected by reducing the free volume to a point at which the long-range cooperative motions are extinguished. At this point, the so-called glass transition temperature is reached at which temperature the polymer, even if it is a naturally elastomeric one, will become glassy and more friable.

An alternative approach to inducing a glassy state in a polymer has here been discovered in which an elevated temperature (as used herein, "elevated temperature" is used to mean a temperature substantially above the glass transition temperature of the polymer and preferably one which approaches ambient temperature) is maintained but the movement of the polymer is subjected to a mechanical restriction by filling the free volume of the polymer with a form-stable material. The observed effect is the same as cooling the polymer to its glass transition temperature. One should recognize that free volume, from a thermal point of view, is considered from a reference at which configurational entropy vanishes while, from a mechanical point of view (i.e., filling), it must be considered from a reference of open volume is excess of the van der Waal's volume of the atoms in the polymer. These considerations lead to the following equation that relates parts by weight of filler directly to parts by weight of polymer needed to raise the temperature at which a glassy state is observed a given amount when the filler is introduced microscopically.

$$\frac{\text{parts by weight filler}}{\text{parts by weight polymer}} = \frac{\frac{(Tge-Tg)(0.116)}{Tg} + V_s(Tge) - V_w}{V_{fill}(Tge)}$$

where
- Tg = normal polymer glass transition temperature (absolute)
- Tge = elevated temperature (absolute) at which a glassy state is desired $V_s(Tge)$ = specific volume of the polymer at $Tge$ $\left(\frac{1}{\text{density}}\right)$ Vw = van der Waal's specific volume of the polymer chain (this can be calculated from atomic volume data and and known polymer composition or used as 0.769 cc/g for a wide variety of polymers containing carbon, nitrogen, oxygen and hydrogen atoms)

$V_{fill}(Tge)$ = specific volume of filler at $Tge$ $\left(\frac{1}{\text{density}}\right)$ For example, calculations made in accordance with the foregoing yield the following values:

| Polymer | Filler | Tg(°k) | Tge(°k) | Vs(Tge) | ppw Filler ppw Polymer |
|---|---|---|---|---|---|
| $(CH)_2\infty$ Amorphous[3] nitrile rubber | Sugar[1] | 212 | 300 | 1.043 | 0.65 |
| Natural[4] rubber | Sugar[1] | 247 | 300 | 0.961 | 0.342 |
|  | Sugar[1] | 200 | 300 | 0.987 | 0.435 |
| Nylon 6[5] | Ortho-[2] boric acid | 243 | 300 | 0.823 | 0.116 |
| Nylon 11[6] | Ortho-[2] boric acid | 203 | 300 | 0.875 | 0.233 |

Assumptions:
1. $V_{fill}(Tg) = 0.633$
2. $V_{fill}(Tge) = 0.696$
3. Hycar 1512, B. F. Goodrich, density at Tge = 0.986
4. Density at Tge = 0.98
5. Density at Tge = 1.13
6. Density at Tge = 1.04

In support of the foregoing concepts, it is consistent with accepted theory that Tg is an iso free volume condition [Fox and Flory, J. App. Phys., 21, 581 (1950); Fox and Flory, J. Am. Chem. Soc., 70, 2384 (1948)]. This being true, it follows that an apparent Tg will be observed whenever the free volume ratio is reduced to a specific value. One value derived for the free volume ratio at Tg is 2.5% which, when empirically evaluated for a wide variety of systems, lead the above researchers to the belief that near Tg, the macroscopic effects follow from universal mechanistic interactions. From this it was logically concluded that near Tg there is a universal function in which the rates of the processes depend on temperature only through its effect upon the free volume [Williams, Landel and Ferry, J. Am. Chem. Soc., 77, 3701 (1955)].

Later theoretical investigations by Miller [J. Chem. Phys., 49, 1343 (1966)] and Eisenberg and Siato [J. Chem. Phys., 45, 1673 (1966)] showed correspondence between phenomenological free volume theory and the mechanistic Gibbs-DiMarzio theory for a free volume ratio of 3.6% at Tg which is in satisfactory accordance with the empirical value of 2.5%.

In considering the microscopic filling or what will hereafter sometimes be referred to as "intra"molecular filling, to effect an apparent increase in Tg, it is important to distinguish between this phenomenon and those which occur through the use of plasticizers, antiplasticizers and solid fillers as known to the prior art. As discussed above, plasticizers will have the effect of softening the polymer, modifying the stress/strain curves, improving crystallization resistance, increasing low temperature flex and reducing the brittle temperature (Tb). Antiplasticization involves filling a polymer to increase tensile modulus and tensile strength with reduction of ultimate elongation and impact strength. Plasticizers exhibit this phenomena at low concentration, and both plasticizers and antiplasticizers reduce the brittle temperature. While the free volume theory is applicable to these systems, it must be recognized that the brittle temperature is reduced and is correlative with an increase in free volume.

The concept of intramolecular filling to increase Tg has not been previously recognized. There are a few literature references wherein it is reported that some increase in Tg is obtained when fillers are added, but there is no recognition of the geometry of the volume increments to be filled and the requirements placed upon the properties of the filling material. Quite simply, the macroscopic size of the fillers that are available for use with polymers, as compared with the volume increments to be filled, is such that the filler cannot fit within the voids and fill the free volume without disrupting molecular configuration. For ease of understanding, "filling" as is recognized in the prior art may be viewed as an "inter"molecular filling as opposed to the "intra"molecular one utilized in the practice of this invention. For example, it has been reported that an extremely fine carbon black (HAF) having a particle size of 26 to 29 millimicrons raised the Tg of an SBR rubber only 0.2°C for every 10 pph by weight of carbon black added [Kraus & Gruver, J. Polymer Sci., part A.2, 8, 571 (1970)]. This is consistent with the free volume theory here set forth if consideration is taken of the fact that the volume increments to be filled have an upper value in the order of from 0.2 to 2 millimicrons [Miller, J. Chem. Phys., 49, 1343 (1961)]. Thus, as practiced in the prior art, fillers are so large compared to the voids between molecules so as to cause reorientation of the polymer chains in contrast to the intramolecular filling of this invention that does not disrupt the normal orientation or configuration of the polymeric molecules. Even in the unlikely event that a few filler particles, such as carbon black, were to be incorporated into the natural structure of the polymer molecules, these fillers are sufficiently large in comparison with the polymer molecules that a reduction of free volume to a value near that of the glassy state is not physically realizable.

THE FORM-STABLE MATERIAL

To achieve the desired intramolecular filling, considerable care must be taken in the selection of the form-stable material. Obviously, its most important characteristic must be its size, or rather lack of size, that will permit filling the empty volume of the polymer to a point at which there is an apparent increase in Tg to an elevated temperature. If the form-stable material is of this size so that it can conveniently be included within the volume increments, a number of desirable results will be obtained. First, fine control can be exercised over Tge. Next, the amorphous configuration of the polymer will be retained after filling (as opposed to using a large filling material that may somewhat reduce free volume and, even at its maximum level, only slightly increase Tg at the expense of rearranging the polymer chain configuration). Finally, the possibility of obtaining a contiguous macroscopic phase of material foreign to the polymer is, in contrast to larger fillers, greatly reduced or eliminated.

In somewhat more detail, the microscopic filler of this invention must be form-stable in its pure form and must be obtainable in a basic particle size smaller than the volume increments of the polymer. This requires the particle size to be less than the chain size of the polymer and in a magnitude not to exceed between about 0.2 and 2 millimicrons. If the filler particles are of monomer configuration, they should be smaller, and if spherical, even smaller still.

It is important that it be physically possible to enter the form-stable material within the free volume in sufficient quantities as to achieve the desired Tge. This problem must be resolved not only with regard to the properties of the form-stable material itself, but also with due concern for the polymer system with which it is to be used. First, the form-stable material should be compatible, at least physically, with the polymer system with which it is to be used. For example, if the polymer system is a latex, a water-soluble material may be entered into the latex essentially as molecular units. Being water-soluble, the form-stable material will thicken the latex and aid in the viscosity build-up (as will later be seen is frequently advantageous). It is of importance that the form-stable material be soluble in sufficient quantities in the latex to permit obtaining the desired Tge, but, at the same time, the material must not cause coagulation of the latex. Lastly, the form-stable material should not be soluble in the polymer in order to prevent cooperative motion between adjacent but not chemically bonded polymer/additive regions.

Still a further important criterion for the selection of the form-stable material is that it should be readily removable from the polymer in order that Tg can be restored. For example, in the production of fine powders, it may be desired to raise Tg to ambient levels to obtain a readily friable polymer. After the polymer has been reduced to powdered form, however, the original Tg and other rheological properties should be restorable. Most conveniently, this can be achieved if the form-stable material is removable as by leaching, volatilization, sublimation or the like.

Form-stable materials that best meet the above criteria are the saccharides and soluble low molecular weight cellulosics (hereafter simply referred to as "sugars"). These materials may readily be dissolved in a latex in sufficient quantities to obtain the desired free volume ratio, they are generally compatible with latices, they are not soluble in the polymers, they may be precipitated simultaneously with the coagulation of the latex particles as form-stable materials at essentially a molecular level to fill the free volume of the polymer by the simple expediency of removing the water from the latex suspension/sugar solution, and lastly, due to their solubility, these microscopic fillers may be removed from the polymer to restore Tg and other rheological properties simply by leaching with water.

Another method that is proposed to incorporate extremely finely divided particles within the free volume of a polymer is to introduce a liquid, such as water, into the system that may be frozen to form minute solid particles at the time the polymeric materials are being coalesced. An advantage of this method lies in the fact that after the polymeric mass has been formed, the form-stable material may readily be removed by volatilization or sublimation.

And by yet another method, the form-stable material may be mixed with the polymer while at temperatures above the melting points of both the form-stable material and the polymer. Upon freezing of the two, the form-stable material will be deposited within the free volume of the polymer. For example, the use of orthoboric acid as a form-stable material is proposed for use in this technique with various polyamides.

INTERMEDIATE AND ULTIMATE PRODUCTS

Powders

A number of natural and synthetic polymeric materials are available in the form of latices. Generally, a "latex" is meant to mean any liquid suspension of finely divided polymer particles. These latices are produced in nature by rubber plants and synthetically are derived, for example, from suspension polymerizations. Common examples of these include natural and synthetic rubbers, urethanes, vinyls, acrylics, fluorinated hydrocarbons, and the like.

Except for the application of thin films, latices cannot ordinarily be used in their existing form. It is not possible, for example, to form solid articles of more than a few mils thickness. This is due to the fact that the particle size of the polymers in the latex are so small that when the liquid evaporates, the high free surface energy of the particles will cause them to coalesce into a film without the application of pressure. Due to this film formation, it is impossible to remove the liquid from a film of more than a few mils thickness without cracking and generally giving the appearance of caked dry mud.

It necessarily follows that unless it is intended to use latex as a thin coating material, it is necessary to separate the polymeric materials from the liquid as by coagulation or evaporation. In the case of rubber, this results in the formation of crinkled sheets referred to as "crepe rubber." The crepe rubber is compounded with various materials including fillers, extenders, curing agents, accelerators and the like, and, in order to obtain a uniform dispersion of the various ingredients, it is necessary to utilize intensive milling procedures as by working the compound in Banbury or differential speed roll mills. This results in a sheeted product which then must be ground back into a coarse powder for use in forming processes such as extrusion or compression molding.

In contrast to the foregoing, the present invention provides a simple route by which elastomers may be fully compounded without the capital investment and processing difficulties inherent in the prior art. All of the required additives can quite simply be beaten into the latex along with the form-stable material, the compounded latex and form-stable material are evaporated to dryness, as by continued beating or casting and drying in the form of a sheet, and the resulting product, due to the apparent increase in its Tg, is readily comminuted at ambient temperatures. Once the desired particle size is obtained, the form-stable material is removed from the powder, as by dissolution, and the powder is then available either as an intermediate product that may be used in various shape formation processes or directly as a coating material.

The above process for compounding a useful polymeric powder directly from a latex is also of considerable utility with polymers other than natural and synthetic rubbers. For example, in the preparation of coating materials that are applied to substrates as dry powders and are then fused by heat over the surface of the substrates to form protective coatings (sometimes referred to as "fusion coating processes"), it is generally necessary to include within the polymer system various additives, including fillers, pigments, plasticizers, stabilizers and the like. To obtain high quality coating materials, as in the case of rubber, it is desirable to use intensive milling techniques to assure uniform dispersion of the additives throughout the polymeric material. As in the case of rubber, this generally results in a compounded product in sheet or extruded form which must be chopped and ground, frequently by cryogenic processes, in order to obtain small particles that are useful in fusion coating processes. But, as described above, in the practice of this invention, various additives can be mixed directly with a latex in which is dissolved a form-stable material, the latex is then evaporated to dryness, the residual material is then ground into a fine powder (actually, "crumbled" is frequently a more descriptive term), and finally the form-stable material is leached from the powder. The powder so formed is suitable for use in any process utilizing powders, such as fusion coating, rotational molding pressing and sintering, and the like.

FORMATION OF ARTICLES FROM POWDER

The powders formed by the process of this invention can be prepared in particle sizes that are generally quite unique. In the case of suspension polymerizations, particles in a submicron particle size (e.g., 0.01–0.1 micron) are obtained. Also, by known grinding techniques, relatively larger particles (e.g., above 40 microns) are produced. However, in the case of many polymeric materials, there is a hiatus between these sizes, and it is unusual and difficult to obtain polymers in this intermediate range of from about 0.1 to 40 microns. This size range is of particular interest because of the unusual surface properties of such sized particles. Further, particles in this size range can conveniently be produced in the practice of this invention.

It is known that all materials have a property known as "free surface energy" which may be considered to be a potential to do work. It is also known that the ratio of particle surface area to volume increases rapidly as particles become smaller and smaller. Generally, an order of magnitude reduction in particle size will yield an order of magnitude change in the ratio of surface area to volume of the particle. As an example, a 100-micron diameter particle has an approximate ratio of 0.02 surface units per volume unit whereas a 10-micron diameter particle will have an approximate ratio of 0.2 surface units per volume unit.

Since net free energy is a function of free surface energy per unit area times the units of area, it becomes apparent that net free surface energy increases rapidly as particle size decreases and unit value remains constant (e.g., a one-inch cube has six square inches of surface whereas a one-inch cube cut into ¼-inch cubes has a surface of 24 square inches). Free surface energy begins to be a noticeable force at particle sizes below 10 microns and becomes quite significant at particle sizes below 0.1 micron. This can be appreciated by virtue of the fact that particles in the 10-micron size range have surface areas of about 0.004 square meters per gram whereas particles in the 0.1-micron range have surface areas of about two square meters per gram. It is this force that is responsible for a continuous film to form from a latex without the need of outside forces to cause the particle to coalesce.

From another aspect, the force of the free surface energy may be demonstrated by considering the average compressive deformation values of polymers. A polymer having a 2,000 psi deformation value in powder form 10 microns or larger will require at least 200 psi of external force to compact in into a solid, nonporous body. However, if the same polymer is reduced in size to 0.1 micron or smaller, it will form an homogenous film without the application of any external pressure. Thus, it can be seen that if the particle size is sufficiently small, the free surface energy of the particles may be utilized to do at least a portion of the work required to compact the particles and form a cohesive body.

It has been found that the compacting pressure normally believed to be necessary in the formation of solid bodies can be appreciably reduced when the powder used is of a small enough particle size so that its free surface energy effectively contributes to the externally applied compacting forces. Generally, to achieve this effect, the particle size should be less than 10 microns. On the other hand, particles substantially less than 0.1 micron are not desired since their free surface energy is so high that they will automatically form cohesive bodies, such as films, without any external pressure being applied. By selecting particles in this size range — that is, from about 0.1 micron to 10 microns — it has been found that solid or porous bodies can be made by pressing the powders together under comparatively low to moderate pressures. For purposes of this specification and the appended claims, powders in this defined size range or of the defined free surface energy levels, are referred to as "active powders."

The use of active powders makes available inexpensive forming processes that do not require elaborate high pressure molds. Further, in the case of polymers that must be cured after compaction, it has been found that active powders can be compressed into sufficiently dense and cohesive structures so that free-standing curing can be conducted outside of the confines of a mold cavity. Illustrative of the foregoing, reference is made to the current process of retreading automobile tires. In accordance with present practice, the rubber latex is dried, it is compounded on a large and expensive mill, and it is then sheeted and formed into a belt suitable for surrounding the old tire carcass. The carcass and belt are placed into a mold and pressures of about 100 psi and temperatures of about 275°–300°F are utilized to bond the belt to the carcass and to form the pattern of tread upon the belt. Simultaneously with this shape-forming process, the rubber is cured. The mold used is expensive and the cycle times under these conditions may be as high as an hour and a half. As a result, production per tire mold is slow and the capital investment is high.

In contrast to the foregoing, the use of active powders greatly simplifies the process. The preparation of the powders is much less involved than that required to obtain the rubber belt and the compounded active powder is easily distributed around the outside of the carcass. After the mold is charged and closed, similar compacting pressures are used to form the tread; however, the cycle time is reduced to about five minutes. This green (uncured) article may then be removed from the mold and placed in an oven for curing. As a result, the productivity of a given mold is increased by ten- to twenty-fold.

In addition to greatly simplifying the production of shaped articles by use of active powders, the present invention makes possible the manufacture of certain articles of sizes and shapes that cannot, as a practical matter, be made by any of the usual production techniques. This is true since the use of active powders considerably reduces the need for high pressures and thus comparatively simple and inexpensive molds may be used. For example, suppose it were desired to cover a large mandrel with a porous elastomer for use as a dewatering roll. There is no convenient way this can be done without considerable expense. However, in the practice of this invention, a comparatively inexpensive lightweight mold can economically be constructed in which a roll cover can be cast.

While not specifically referred to above, it should be understood that active powders may be utilized to form shaped articles of any desired porosity. Depending upon size of the active particles and the pressure at which they are compacted, shaped articles of widely varying porosity can be formed. Products made in this manner are of particular interest due to their open-celled structure and the control over their capillarity that can be exercised. Thus, one of the unique features of this invention lies in the fact that the density of an article made from active powders may be varied at will from one that is fully compacted and densified to one that has a desired porosity.

The utilization of the active powders also makes possible the use of techniques somewhat akin to slip casting. In this process, a slurry is poured over a porous form and the liquid of the slurry is drawn, as by vacuum, through the form. Alternatively, pressure is sometimes applied to the top of the slurry to force it through the porous form.

In the case of active powders made in accordance with this invention, it has been found possible to suspend the particles in water (advantageously utilizing surfactants) to pour the slurry into a mold, for example, a cylindrical one, and to express the water from the slurry by applying pressure on a porous plate that forms one end of the mold. The porosity of the green article so formed will depend upon the compacting pressure, and after it is removed from the mold, it may be cured or fused in an oven.

Reference has been made above to curing a green compacted article made from the active powders. It will be understood that a green article is cured if, for example, the polymer is rubber and polymerization or cross-linking is carried out to develop the ultimate properties of the rubber and strengthen the bond between the compacted active powders. In the case of thermoplastic resins, the green article is heated to sinter the active thermoplastic powders together and improve the strength over that of the green article. As is known, a sintering temperature is one at which the surface of a polymer particle becomes tacky and adheres to other particles, but below that temperature at which the polymer enters a uniform molten phase.

CASTING FOAMS

As discussed above, active powders may be used in the formation of porous products by pressing and sintering techniques. By another variation of this invention, porous bodies can be made by casting foams to produce porous articles ranging from dishwashing sponges, carpet pads and mattresses for use in the household, to opencelled structures for sophisticated industrial uses such as dewatering and drying rolls, liquid holding, metering and dispensing devices, and the like.

A common method used for making porous articles utilizes foam techniques wherein a two-phase dispersion is formed by filling the polymer, while in a fluent state, with a myriad of gas bubbles and then rigidifying it as by cooling, solvent removal, polymerization, gelation, or the like. The gas bubbles may be distributed throughout the polymer either by mechanical means, such as beating in or injecting gases, or by incorporating chemical blowing agents in the polymer that decompose into gaseous products when heated. Porous articles made by foam techniques, unless of quite low density, generally have a closed cellular structure, and since there is no means of communication between the voids, fluids cannot be absorbed or desorbed from the article. On the other hand, if the article is of a very low density, the cell walls will tend to be thin and fragile, which facilitates their rupture either upon formation of the article by the internal gas pressure or by a latent treatment step in which the article is deformed, as by compression, to fracture the thin walls.

In the case of medium- to high-density foams - for example, less than 80% porosity - the cell walls are proportionately thicker and are much more difficult to fracture, particularly if the foamed articles are made from resilient or elastomeric materials. Thus, there is no convenient way known to the prior art to prepare an open-celled foamed structure of medium- to high-density (for example, with a porosity of 60 to 80% or less).

By another technique that is less frequently used, leachable salts are mixed into a fluent polymeric material and, after an article has been formed, as by molding, the salts are leached from the article to leave an open-cell structure. This technique has limited application, in large part due to the difficulty of leaching out the salts. Particularly in the case of articles having moderately thick cross sections, the leaching operation can be difficult and time-consuming.

As discussed above with regard to active powders, pressing and sintering operations are also utilized to prepare porous articles. In this technique, a polymer is prepared in pulverulent form and compacted in a mold, usually under considerable pressure. The green porous body is then sintered to develop its ultimate strength. These processes suffer from the disadvantage that it may be difficult to prepare the polymeric particles in the size range needed. Further, if high compacting pressures are required, the molds become expensive and difficulties are encountered if an attempt is made to make articles in anything other than a regular cross section. Note that these difficulties are not attendant with the use of active powders, as discussed above.

There may also be mentioned a method of making foams that is only of specialized utility in which porous articles are produced by precipitating polymers from a liquid to form a gel-like structure. The liquid is then removed from the gel-like structure by the application of pressure, leaving a porous body having a series of interconnecting pores.

In the case of low-density porous structures that are used in noncritical applications, such as insulating material, mops and dishwashing sponges, the configuration of the pores is generally noncritical. On the other hand, porous materials are frequently used in applications where the structure and configuration of the pores can be of critical importance. For purposes of illustration of this point, reference is made to porous materials that are used to hold and deliver, on demand, controlled amounts of fluids, such as inks. The desired properties for the porous material include a high capacity for storing fluid, a high capillarity to prevent the fluid from "leaking" out of the pores until demand is made, and a low impedance to the flow of fluid. To optimize these properties, the configuration of the internal voids, the communicating orifices between the internal voids, and the surface porosity must all be carefully selected.

While perhaps somewhat of an oversimplification, it may be stated that for many applications in which fluids are dispersed, the internal voids should be large to maximize storage capacity, the communicating orifices between internal voids (hereinafter referred to as "windows") should be large to reduce internal impedance, and the surface openings should be of small diameter in order to obtain the desired capillarity. Despite the fact that it is desirable for the surface openings to be of small diameter, it may be important, in order to deliver desired quantities of fluid, that the total open area of the surface be large. In other words, a large number of small openings is desired.

Due to the different requirements for the size and distribution of the external voids in comparison with the surface openings, a different foamed structure should be developed at these different areas. One advantage that accrues in the practice of this invention lies in the facility with which this result can be accomplished.

To illustrate the foregoing, reference is made to the production of a porous pad used for delivering ink to, and distributing it over the back of a stencil of a mimeograph machine. In this application, large internal voids and windows are required to reduce the impedance to the flow of ink to a minimum so that, in high speed duplicating processes, a solid line or a high density dot pattern can be laid down.

In a preferred process for making these ink pads, a form-stable material, preferably sugar, is dissolved in a latex. The latex is then aerated as by beating or percolating air bubbles through it. After the density of the latex has been reduced by the desired amount, the foamed latex is poured into a mold or onto a form and heated to remove the water content.

As the latex begins to dry, the concentration of the polymeric particles becomes higher and higher and, of necessity, the particles move closer and closer to each other. It is believed that when these particles begin to agglomerate, they tend to displace liquid between them due, at least in part, to a net driving force resulting from the lowering of their free surface energy. The liquid that is displaced must move into those areas where the density of the particles is lower, which areas are believed to form the windows between the voids.

Simultaneously with the coagulation of the polymeric particles, the concentration of the sugar begins to rise. At some point, when sufficient water has been removed, the sugar is precipitated as form-stable particles. It is believed that these form-stable particles are deposited at two locations. First, as discussed above, they will be deposited at a molecular level within the free volume of the polymer. Second, to the extent that water is displaced from the coagulating polymer bodies, the sugar solution will occupy those regions where the density of the polymer particles is least and, accordingly, as evaporation to dryness proceeds, the remaining sugar structure will collapse and open windows will be formed between the voids. Further, since the cast article is now in a glassy and very brittle condition, further windows can be opened, if desired, by comparatively low forces such as, for example, thermal shock induced by heating at comparatively low temperatures.

The cast ink pad so prepared is not usable due to its extreme brittleness. However, after the desired structure has been obtained, the sugar is leached with warm water from the pad. The result is an elastomeric ink pad having the rheological properties of the starting polymer materials.

In the foregoing process, the air bubbles in the latex have a degree of mobility that causes them to migrate and coalesce. To some extent, this action is inhibited by increasing the viscosity of the latex by dissolving sugar in the latex, but, nonetheless, if the foamed latex is allowed to stand for any length of time before it is cast into a pad, the gas bubbles will coalesce and increase in diameter. This phenomenon may be used to considerable advantage by causing the cast foam to rigidify at different points in time throughout its cross section. This is a comparatively simple thing to accomplish since rigidification is a function of vaporization of the water from the latex and the rate of evaporation can be controlled by the type of heating and the temperatures that are used. Thus, if high-energy radiant heating is used, the surface of the cast foam may be rigidified almost instantly while the interior of the foam remains mobile for a somewhat longer period of time. If the foam as cast contains small bubbles, the size of these bubbles can be maintained at the surface to define high capillarity openings. Since the interior of the foam can be controlled to rigidify over a somewhat longer period of time, the small bubbles in the foam are given an opportunity to coalesce in larger bubbles prior to rigidification of the foam. Thus, a monolithic elastomeric foamed structure can be made that has large internal fluid capacity, a low impedance to the flow of fluids, and a high surface capillarity.

The surface of the ink pad so produced, particularly those made mostly from rubbers, may have an undesirably high coefficient of friction which may cause the stencil to be pulled unevenly and distort the reproduced image. It has been found that this can be easily cured by placing a thin porous surface coating over the pad, by the same method outlined above, comprised of a more slippery material such as a vinyl, acrylic, polytetrachlorethylene and mixtures thereof.

RELIEF SURFACES AND OTHER SHAPED ARTICLES

The novel feature of this invention — that is, the ability to control the brittleness of a polymer selectively — makes it possible to form articles in various novel ways. For example, if a sheet of polymer is cast in which the free volume is filled with a form-stable material, the sheet will be brittle and readily friable. Thus, if the sheet is impacted by some pressure forces, such as mechanical, chemical, electrical, thermal or, for that matter, any frequency of electromagnetic energy, the portion so impacted will be fractured and can selectively be removed from the remainder of the sheet. For example, polar finely divided iron particles can be mixed with a latex and, after a sheet has been formed, it may be exposed selectively to magnetic fields. This will cause rotation of the iron particles at the points of exposure, thus fracturing the sheet at these points. The fractured portions can be removed, as magnetically, and the remaining sheet can then be leached to remove the form-stable material and restore properties of elasticity or toughness to the sheet.

It is contemplated that reliefs so prepared will find utility as, for example, a stencil used in printing. The continuous portion of the sheet can be heated to seal any voids and then mounted upon an ink-feeding device.

DESCRIPTION OF THE DRAWING

The drawing is a schematic representation of several of the possible methods for practicing the instant invention. Beginning at the top and reading down, the drawing indicates the various materials that are added and removed, at appropriate times, from the starting polymer, as well as the use of several methods to form various products. Essentially, it can be seen that the addition of the form-stable free volume filler produces a glassy polymer with an apparent increased Tg while the removal of the free volume filler reduces the Tg to below ambient temperature.

EXAMPLE I

The following ingredients were dispersed using a three-blade propeller mixer. (As used herein and elsewhere, all parts of active ingredients are by weight unless otherwise noted.)

75 parts nitrile rubber latex (HYCAR 1512)
25 parts vinyl latex preplasticized with dioctylphthalate (GEON 576)
1 part carbon black (VANDERBILT P-33)
2 parts antioxidant (AGE RITE WHITE)
1 part dispersing agent (DARVAN 7)
20 parts McNamee clay
5 parts zinc oxide
2.5 parts sulphur
2 parts methyl tuads
1.25 parts thickener (POLYCO 296W)
60 parts granulated sugar A planetary whisk was then inserted in the mixer and air was beaten into the mixture until its density was reduced to about 0.37. The lightly foamed material was then coated onto an open-mesh fabric on a knife-over-roll coating machine to form a wet film of about 77 mils. The open-mesh fabric used was a Veriform Basic liner supplied by Stacy Fabrics.

The coated cloth was immediately subjected to high-intensity infrared radiation for slightly less than twenty seconds and then was cured and dried for nine minutes using low-intensity infrared, producing a surface temperature of about 300°F. The dried film was approximately fifty mils in thickness.

The initial high-intensity infrared treatment caused the surface to set up or become rigid almost immediately. As a result, a fine porous structure was developed on the surface. On the other hand, the subsequent slower treatment caused the interior of the coating to cure and dehydrate much more slowly and, as a result, the interior voids were much larger than the surface openings.

The porous structure so prepared was extremely brittle, but after it was washed in running water, it became quite rubbery. The structure was then cut to size and installed as an inking pad on a mimeograph machine. It was found that ink fed freely through the pad and provided adequate ink to the stencil so as to make rapid printing possible with solid lines. At the same time, when the mimeograph machine was stopped, ink did not drip from the pad due to the high capillary forces at its surface.

EXAMPLE II

This example illustrates a method of preparing powders using the techniques of this invention. Initially, the following ingredients were mixed together in a three-blade propeller mixer:

100 parts neoprene rubber from latex (DUPONT 601A)
20 parts McNamee clay
1 part carbon black (VANDERBILT P-33)
1 part antioxidant (AGE RITE WHITE)
10 parts zinc oxide
1 part dispersing agent (DARVAN 7)
2 parts butyl zymate
1.25 parts thickener (POLYCO 296W)
100 parts confectioner's 10X sugar After the ingredients were thoroughly mixed together, a planetary whisk was substituted for the beater and the density of the mix was reduced to about 0.4. The foam was cast onto a metal surface in about a 100-mil thickness. The cast film was dried in an oven below 300°F.

After the film was thoroughly dried, it was found to be extremely friable and could readily be crumbled into fine particles. After a powder was formed, the powder was water-leached to remove the sugar, which resulted in the production of a resilient, elastomeric, fully-compounded rubber having an average size of about two microns.

EXAMPLE III

The powder prepared in Example II was compacted in a cardboard mold at a pressure of about 15 psi. The green article was removed from the mold without difficulty and was sufficiently tough that it could be handled without damaging the pressed shape. The shape was then placed in an oven at about 275–300°F for approximately an hour. During this time its properties fully developed as by bonding of the particles together and curing of the rubber. The density of the rubber product was approximately 50% that of normal.

EXAMPLE IV

The experiment of Example III was repeated except that a metal mold was used and the compaction pressure was increased to 100 psi. In this case, no porosity could be detected and the product appeared fully densified.

EXAMPLE V

The experiment of Example II was repeated except that a nitrile rubber was substituted for the neoprene. Similar results were obtained.

EXAMPLE VI

The experiment of Example II was repeated except that a vinyl latex, preplasticized with dioctylphthalate (GEON 576), was substituted for the neoprene latex, the compounding agents were omitted, and the amount of sugar used was reduced to 60 parts. A fine powder as described was obtained.

We claim:

1. A method for preparing a polymer in pulverulent form comprising the steps of dissolving a sugar into a liquid suspension of finely divided particles of the polymer, coagulating with precipitation the polymer suspension removing the liquid from the coagulated and precipitated suspension to form a dried polymer mass, comminuting the dried polymer mass and removing the sugar from the comminated polymer mass.

2. A method according to claim 1 wherein the polymer has a glass transition temperature below ambient temperatures.

3. A method according to claim 1 wherein the particle size of the pulverulent polymer is from about 0.1 to 10 microns.

4. A method according to claim 3 wherein the particles of the pulverulent polymer are lightly compacted and sintered to form a porous body.

5. A method according to claim 3 wherein the particles of the pulverulent polymer are compacted and sintered under sufficient pressure to form a solid body.

6. A method for fusion coating which comprises contacting a substrate with the pulverulent polymer produced in accordance with claim 1 and fusing the powder into a continuous coating on the substrate.

7. A method according to claim 1 comprising adding fillers, pigments, plasticizers and stabilizers to the liquid polymer suspension prior to its coagulation and precipitation to form a fusion coating powder.

8. A method for fusion coating substrates which comprises distributing the powder made in accordance with the method of claim 7 over the surface of a substrate and fusing the powder into a continuous coating on the substrate.

9. A method according to claim 1 wherein the sugar fills, in part, the free volume of the polymer.

10. A method according to claim 1 wherein the polymer is an elastomer.

11. A method according to claim 10 in which an apparent increase in the glass transition temperature, approaching ambient temperatures is observed after the liquid polymer suspension is coagulated and precipitated and the precipitated polymer mass is dried but before the sugar is removed.

12. A method according to claim 1 wherein the liquid suspension is a latex.

13. A method according to claim 1 wherein the sugar is a water-soluble, low molecular weight cellulosic or a saccharide.

* * * * *